US 9,238,415 B2

(12) United States Patent
King et al.

(10) Patent No.: US 9,238,415 B2
(45) Date of Patent: Jan. 19, 2016

(54) APPARATUS FOR RAPID CHARGING USING ONBOARD POWER ELECTRONICS AND METHOD OF MANUFACTURING SAME

(71) Applicant: General Electric Company, Schenectady, NY (US)

(72) Inventors: Robert Dean King, Schenectady, NY (US); Robert Louis Steigerwald, Burnt Hills, NY (US)

(*) Notice: Subject to any disclaimer, the term of this patent is extended or adjusted under 35 U.S.C. 154(b) by 188 days.

(21) Appl. No.: 14/085,313

(22) Filed: Nov. 20, 2013

(65) Prior Publication Data

US 2015/0137751 A1     May 21, 2015

(51) Int. Cl.
| | |
|---|---|
| H02J 7/00 | (2006.01) |
| B60L 11/18 | (2006.01) |
| B60L 11/14 | (2006.01) |
| B60L 15/00 | (2006.01) |

(52) U.S. Cl.
CPC ............. *B60L 11/1818* (2013.01); *B60L 11/14* (2013.01); *B60L 11/1803* (2013.01); *B60L 11/185* (2013.01); *B60L 11/1811* (2013.01); *B60L 11/1812* (2013.01); *B60L 15/007* (2013.01); *H02J 7/0042* (2013.01); *H02J 7/0055* (2013.01); *B60L 2210/12* (2013.01); *B60L 2210/14* (2013.01); *B60L 2210/30* (2013.01); *B60L 2210/40* (2013.01)

(58) Field of Classification Search
CPC ..... H02J 7/0013; H02J 7/0027; H02J 7/0054; H02J 7/022
USPC .......................................... 320/109, 138, 140
See application file for complete search history.

(56) References Cited

U.S. PATENT DOCUMENTS

| | | | |
|---|---|---|---|
| 5,351,178 A | 9/1994 | Brennen et al. | |
| 7,301,308 B2 | 11/2007 | Aker et al. | |
| 8,030,884 B2 * | 10/2011 | King et al. | ..................... 320/104 |

(Continued)

FOREIGN PATENT DOCUMENTS

| | | |
|---|---|---|
| CN | 202333930 U | 7/2012 |
| EP | 2290778 A2 | 3/2011 |
| EP | 2337183 A2 | 6/2011 |
| FR | 2981521 A1 | 4/2013 |

OTHER PUBLICATIONS

Brandstetter et al., "Control Algorithms of Active Power Filters," Progress In Electromagnetics Research Symposium Proceedings, Cambridge, USA, Jul. 5-8, 2010, pp. 429-433.

(Continued)

*Primary Examiner* — Nghia Doan

(57) ABSTRACT

An apparatus for rapid charging using onboard power electronics includes a DC bus, a first energy storage device coupled to the DC bus and configured to output a DC voltage, a first bi-directional voltage modification assembly coupled to the DC bus, and a high-impedance voltage source coupleable to the DC bus. The apparatus further includes a charging system having a first receptacle coupled to the DC bus and a second receptacle coupled to the first bi-directional voltage modification assembly. The first receptacle is constructed to mate with a first connector coupled to the high-impedance voltage source and the second receptacle is constructed to mate with a second connector coupled to the high-impedance voltage source. A controller is programmed to control a simultaneous transfer of charging energy through the first and second receptacles of the charging system to the DC bus.

22 Claims, 8 Drawing Sheets

(56) References Cited

U.S. PATENT DOCUMENTS

| | | | |
|---|---|---|---|
| 8,080,973 B2 | 12/2011 | King et al. | |
| 8,400,800 B2 | 3/2013 | Alexander | |
| 2010/0080030 A1* | 4/2010 | Wiegman | B60L 11/1868 363/131 |
| 2011/0148353 A1* | 6/2011 | King et al. | 320/109 |
| 2011/0204845 A1 | 8/2011 | Paparo et al. | |
| 2011/0254494 A1 | 10/2011 | Briane et al. | |
| 2013/0020993 A1* | 1/2013 | Taddeo et al. | 320/109 |
| 2013/0234675 A1 | 9/2013 | King et al. | |

OTHER PUBLICATIONS

Bojrup, "Advanced Control of Active Filters in a Battery Charger Application", Department of Industrial Electrical Engineering and Automation (IEA), Lund Institute of Technology (LTH), 1999, pp. i-viii and pp. 1-116.

Khaki et al., "A Hybrid Multi-Loop Controlled FACTS-Based Smart V2G Battery Charger", International Journal of Renewable Energy Research, vol. 3, Issue 1, 2013, pp. 155-160.

Haghbin, "An Isolated Integrated Charger for Electric or Plug-in Hybrid Vehicles", Thesis for the Degree of Licentiate of Engineering, Department of Energy and Environment, Chalmers University of Technology, Goteborg, Sweden, 2011, pp. i-xvi, pp. 1-99.

"New Fast-Charging Combo Coupler Standard (SAE J1772™) for Plug-In Electric and Electric Vehicles", SAE International, Oct. 15, 2012.

European Search Report and Written Opinion from corresponding EP Application No. 141939041 dated Jun. 9, 2015.

* cited by examiner

APPARATUS FOR RAPID CHARGING USING ONBOARD POWER ELECTRONICS AND METHOD OF MANUFACTURING SAME

BACKGROUND OF THE INVENTION

Embodiments of the invention relate generally to electric drive systems including hybrid and electric vehicles and to stationary drives that are subject to transient or pulsed loads and, more particularly, to transferring energy between an energy storage device of the vehicle or drive and a power source external to the vehicle or drive to rapidly charge the energy storage device.

Hybrid electric vehicles may combine an internal combustion engine and an electric motor powered by an energy storage device, such as a traction battery, to propel the vehicle. Such a combination may increase overall fuel efficiency by enabling the combustion engine and the electric motor to each operate in respective ranges of increased efficiency. Electric motors, for example, may be efficient at accelerating from a standing start, while combustion engines may be efficient during sustained periods of constant engine operation, such as in highway driving. Having an electric motor to boost initial acceleration allows combustion engines in hybrid vehicles to be smaller and more fuel efficient.

Purely electric vehicles use stored electrical energy to power an electric motor, which propels the vehicle and may also operate auxiliary drives. Purely electric vehicles may use one or more sources of stored electrical energy. For example, a first source of stored electrical energy may be used to provide longer-lasting energy while a second source of stored electrical energy may be used to provide higher-power energy for, for example, acceleration.

Plug-in electric vehicles, whether of the hybrid electric type or of the purely electric type, are configured to use electrical energy from an external source to recharge the traction battery. Such vehicles may include on-road and off-road vehicles, golf cars, neighborhood electric vehicles, forklifts, and utility trucks as examples. These vehicles may use either off-board stationary battery chargers or on-board battery chargers to transfer electrical energy from a utility grid or renewable energy source to the vehicle's on-board traction battery. Plug-in vehicles may include circuitry and connections to facilitate the recharging of the fraction battery from the utility grid or other external source, for example. The battery charging circuitry, however, may include dedicated components such as boost converters, high-frequency filters, choppers, inductors, and other electrical components dedicated only to transferring energy between the on-board electrical storage device and the external source. These additional dedicated components add extra cost and weight to the vehicle.

In addition, on-board or off-board rectifiers may be used to provide high charging currents for rapidly charging energy storage devices. However, such rectification has the undesirable effects of high utility harmonics and a low power factor due to phase shift of the utility fundamental waveforms. The power factor of an AC electric power system is defined as the ratio of the real power to the apparent power and may be expressed as a number between 0 and 1 or as a percentage between 0 and 100. Real power is the capacity of the circuit for performing work in a particular time. Apparent power is the product of the current and voltage of the circuit. Due to energy stored in the load and returned to the source, or due to a non-linear load that distorts the wave shape of the current drawn from the source, the apparent power can be greater than the real power. A circuit with a lower power factor performs less work than a circuit with a higher power factor. Therefore, to perform the same amount of work, a higher voltage or current is input into the circuit with the lower power factor.

While a power factor correction capacitor may be used to improve the low power factor resulting from use of the rectifier, the size of such a correction capacitor is large due to the low frequency of the utility (e.g., 50 or 60 Hz). Further, a power factor correction capacitor has minimal effect on lower-frequency harmonic currents that also contribute to the low power factor and can lead to unexpected system resonances. Dedicated active filters may also be provided, however, implementing such filters adds additional costs to the system in the form of a full-power-rated power electronic converter, which processes the complete charging power using expensive switching devices, and associated controls.

It would therefore be desirable to provide an apparatus to facilitate the rapid transfer of electrical energy from an external source to the on-board energy storage device of a plug-in vehicle that reduces the number of components dedicated only to transferring energy between the on-board electrical storage device and the external source and reduces the charging system costs, while maintaining a high power factor and low harmonic currents.

BRIEF DESCRIPTION OF THE INVENTION

According to one aspect of the invention, an apparatus includes a DC bus, a first energy storage device coupled to the DC bus and configured to output a DC voltage, a first bi-directional voltage modification assembly coupled to the DC bus, and a high-impedance voltage source coupleable to the DC bus. The apparatus further includes a charging system having a first receptacle coupled to the DC bus and a second receptacle coupled to the first bi-directional voltage modification assembly. The first receptacle is constructed to mate with a first connector coupled to the high-impedance voltage source and the second receptacle is constructed to mate with a second connector coupled to the high-impedance voltage source. A controller is programmed to control a simultaneous transfer of charging energy through the first and second receptacles of the charging system to the DC bus.

In accordance with another aspect of the invention, a method for transferring energy between an on-board energy storage device and an external voltage source includes coupling the on-board energy storage device to a DC charging bus, the on-board energy storage device configured to output a DC voltage. The method also includes plugging a first connector coupled to the external voltage source into a first receptacle coupled to the DC charging bus; plugging a second connector coupled to the external voltage source into a second receptacle coupled to the DC charging bus through a bi-directional voltage modification assembly, and programming a controller to close a plurality of contactors to permit a simultaneous transfer of energy to the on-board energy storage device from the external voltage source through the first and second connectors.

In accordance with yet another aspect of the invention, a system includes a remote power source comprising a transformer and a charging system having a DC connector coupled to the remote power source and an AC connector coupled to the remote power source. The system also includes a vehicle having a DC bus, an energy storage device coupled to the DC bus, a DC receptacle coupled to the DC bus, and an AC receptacle coupled to the DC bus through a bi-directional voltage modification assembly. A controller is programmed to control a transfer of charging energy from the remote power source to the DC bus, the charging energy having a high current component transferred through the DC receptacle and a current correction component transferred through the AC receptacle.

Various other features and advantages will be made apparent from the following detailed description and the drawings.

BRIEF DESCRIPTION OF THE DRAWINGS

The drawings illustrate embodiments presently contemplated for carrying out the invention.

In the drawings.

DETAILED DESCRIPTION

Figure 1:
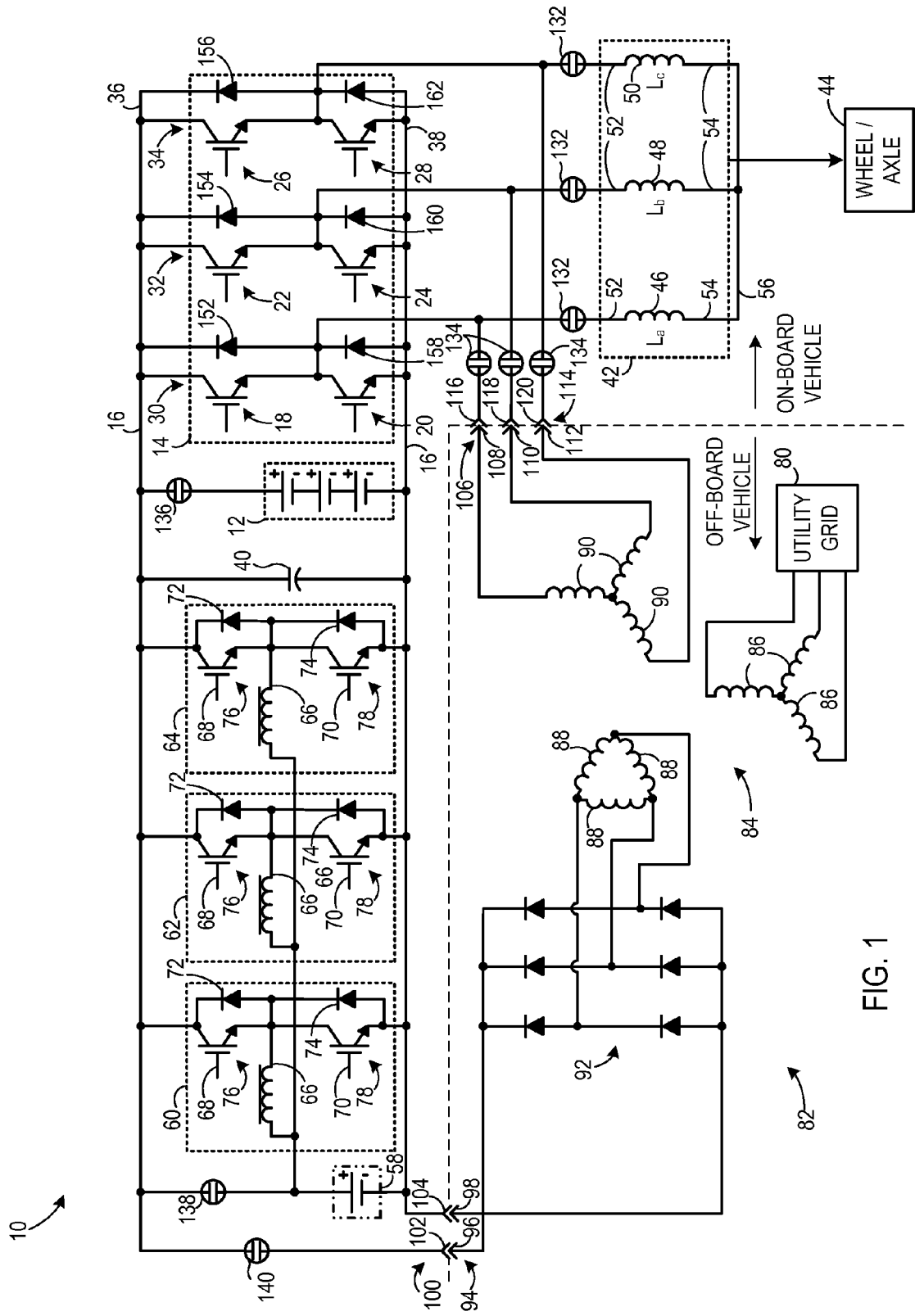
FIG. 1 is a schematic diagram of a traction system according to an embodiment of the invention.

FIG. 1 is a schematic diagram of a traction system 10 according to an embodiment of the invention. Traction system 10 includes a first energy storage device 12. In one embodiment, first energy storage device 12 is a high-voltage or high-power energy storage device and may be a battery, a flywheel system, fuel cell, an ultracapacitor, or a combination of ultracapacitors and batteries, as examples. First energy storage device 12 is coupled to a bi-directional voltage converter assembly 14 via a DC bus or DC charging bus 16. In one embodiment, bi-directional voltage modification assembly 14 is a bi-directional DC-to-AC voltage inverter. Bi-directional DC-to-AC voltage inverter 14 includes six half phase modules 18, 20, 22, 24, 26, and 28 that are paired to form three phases 30, 32, and 34. Each phase 30, 32, 34 is coupled to a pair of conductors including a first conductor 36 and a second conductor 38 of DC bus 16. A DC link capacitor 40 coupled to DC bus 16 and provides a smoothing function for DC bus 16 and filters high-frequency currents on DC bus 16.

An electromechanical device or motor 42 is coupled to bi-directional DC-to-AC voltage inverter 14. In one embodiment, electromechanical device 42 is a traction motor mechanically coupled to one or more driving wheels or axles 44 of a vehicle such as vehicle 122 (FIG. 2) or other electrical apparatus such as a crane, elevator, or lift, as non-limiting examples. Electromechanical device 42 includes a plurality of windings 46, 48, and 50 having a plurality of conductors 52 coupled to respective phases 30, 32, 34 of bi-directional DC-to-AC voltage inverter 14. Windings 46, 48, and 50 also have a plurality of conductors 54 coupled together to form a node 56. This 3-phase connection configuration is often referred to as a "wye" connection. In alternative configurations (not shown), the electromechanical device 42 may be connected in a "delta" configuration and therefore would not include a common node 56.

Traction system 10 includes an optional second energy storage device 58 (shown in phantom) coupled to DC bus 16 to provide power to driving wheels 44. In one embodiment, second energy storage device 58 is a low-voltage or low power energy storage device and may be a battery, a fuel cell, an ultracapacitor, or the like. First energy storage device 12 may be configured to provide a higher power than second energy storage device 58 to provide power during, for example, acceleration periods of the vehicle. Second energy storage device 58 may be configured to provide a higher energy than first energy storage device 12 to provide a longer-lasting power to the vehicle to increase a travelling distance thereof. While second energy storage device 58 is described as being optional, traction system 10 may include second energy storage device 58 and omit first energy storage device 12 in alternative embodiments. In one embodiment, one or both of first and second energy storage devices 12, 58 has an instantaneous acceptance capability that is larger than an instantaneous delivery capability of the high-impedance voltage source 84.

A plurality of bi-directional DC-to-DC voltage converters 60, 62, 64 are coupled to second energy storage device 58 and to DC bus 16 and are configured to convert one DC voltage into another DC voltage. In the embodiment shown, traction system 10 includes three bi-directional DC-to-DC voltage converters, however, traction system 10 may include more or less than three voltage converters in alternative embodiments. Each bi-directional DC-to-DC voltage converter 60, 62, 64 includes an inductor 66 coupled to a pair of switches 68, 70 and coupled to a pair of diodes 72, 74. Each switch 68, 70 is coupled to a respective diode 72, 74, and each switch/diode pair forms a respective half phase module 76, 78. Switches 68, 70 are shown, for illustrative purposes, as insulated gate bipolar transistors (IGBTs). However, embodiments of the invention are not limited to IGBTs. Any appropriate electronic switch can be used, such as, for example, metal oxide semiconductor field effect transistors (MOSFETs), silicon carbide (SiC) MOSFETs, Gallium nitride (GaN) devices, bipolar junction transistors (BJTs), and metal oxide semiconductor controlled thyristors (MCTs).

When a vehicle or apparatus incorporating traction system 10 is parked or not in use, it may be desirable to plug the vehicle into a remote power source such as a utility grid 80 or to a renewable energy source to refresh or recharge first energy storage device 12 and/or second energy storage device 58. Accordingly, FIG. 1 shows an embodiment of the invention including a charging system 82 coupleable the DC bus 16 of traction system 10 for the recharging of energy storage devices 12, 58 such that components of traction system 10 may be used for the dual purposes of recharging energy storage devices 12, 58 and converting energy from energy storage devices 12, 58 into energy usable to drive the load or propel the vehicle.

Charging system 82 includes an external, high-impedance voltage source 84. In the embodiment illustrated in FIG. 1, external voltage source 84 is an off-board poly-phase utility system including a three-phase AC source or transformer of utility grid 80 that may provide, for example, 120 Vac, 240 Vac, or 480 Vac. In such an embodiment one, two, or three phases of high-impedance voltage source 84 may be used to provide charging power. In alternative embodiments, it is contemplated that the external, high-impedance poly-phase voltage source 84 could instead have one, two, six, or any other number of phases. According to another embodiment of the invention, it is contemplated that high-impedance voltage source 84 is a DC voltage source.

High-impedance voltage source 84 includes a plurality of primary windings 86 coupled to a first set of secondary windings 88 and a second set of secondary windings 90. In the embodiment illustrated, the first set of secondary windings 88 is connected in a delta configuration whereas the second set of secondary windings 90 is connected in a wye configuration. However, first and second set of secondary windings 88, 90 may be configured in alternative configurations according to alternative embodiments.

As shown in FIG. 1, traction system 10 includes a three-phase rectifier 92 coupled to the first set of secondary windings 88 and coupled to a receptacle or plug 94 having contacts 96, 98. Plug 94 is configured to mate with a plug or receptacle 100 of traction system 10 having contacts 102, 104. In operation, rectifier 92 rectifies the high charging current received from the first set of secondary windings 88 and delivers the rectified charging current to the energy storage device being charged. In an embodiment where rectifier 92 includes passive switching components, the charging current is limited by the impedance of the transformer. Alternatively, rectifier 92 may include silicon controlled rectifiers (SCRs) to provide for active control over the charging current. In either embodiment, the use of rectifier 92 coupled to the first set of secondary windings 88 permits high charging current to be supplied to traction system 10 in an inexpensive manner as compared to a full-power-rated power converter with expensive switching devices and auxiliary components. While rectifier 92 is illustrated in FIG. 1 as being mounted off-board traction system 10, the simplicity and relatively small size of rectifier 92 as compared to a full-rated power converter permit rectifier 92 to be mounted on-board traction system 10 in alternative embodiments.

While three-phase rectifier 92 permits high charging currents to be supplied to DC bus 16 for charging energy storage devices in an inexpensive manner, the rectification results in relatively high utility harmonic currents and a low power factor. To correct this, the second set of windings 90 of high-impedance voltage source 84 are coupled to the pre-existing bi-directional DC-to-AC voltage inverter 14 of traction system 10 by way of a receptacle or plug 106 having contacts 108, 110, 112. Plug 106 is configured to mate with a receptacle or plug 114 of traction system 10 having contacts 116, 118, 120. During operation bi-directional voltage inverter 14 is controlled to act as an active filter to correct the utility power factor and reduce utility harmonic currents caused by the high-current charging rectifier 92, as described in additional detail below. Because the onboard bi-directional DC-to-AC voltage inverter 14 only has to handle a fraction of the full charging currents, the system operates with high efficiency.

While mating plug and receptacle 94, 100 are described above as a DC connection and mating plug and receptacle 106, 114 are described as a three-phase AC connection, plugs and receptacles 94, 100, 106, 114 may be constructed to receive alternative inputs according to various embodiments. As one non-limiting example, both plug/receptacle 94, 100 and plug/receptacle 106, 114 may be constructed as AC or DC connections. In an embodiment where plug/receptacle 94, 100 are constructed as AC connections, rectifier 92 would be positioned on-board the vehicle and configured to rectify the output of the AC connections for supply to the DC bus. As another non-limiting example, plug/receptacle 94, 100 may be constructed as a rectified single phase input, while plug/receptacle 106, 114 may be constructed as a single phase AC input.

Figure 2:
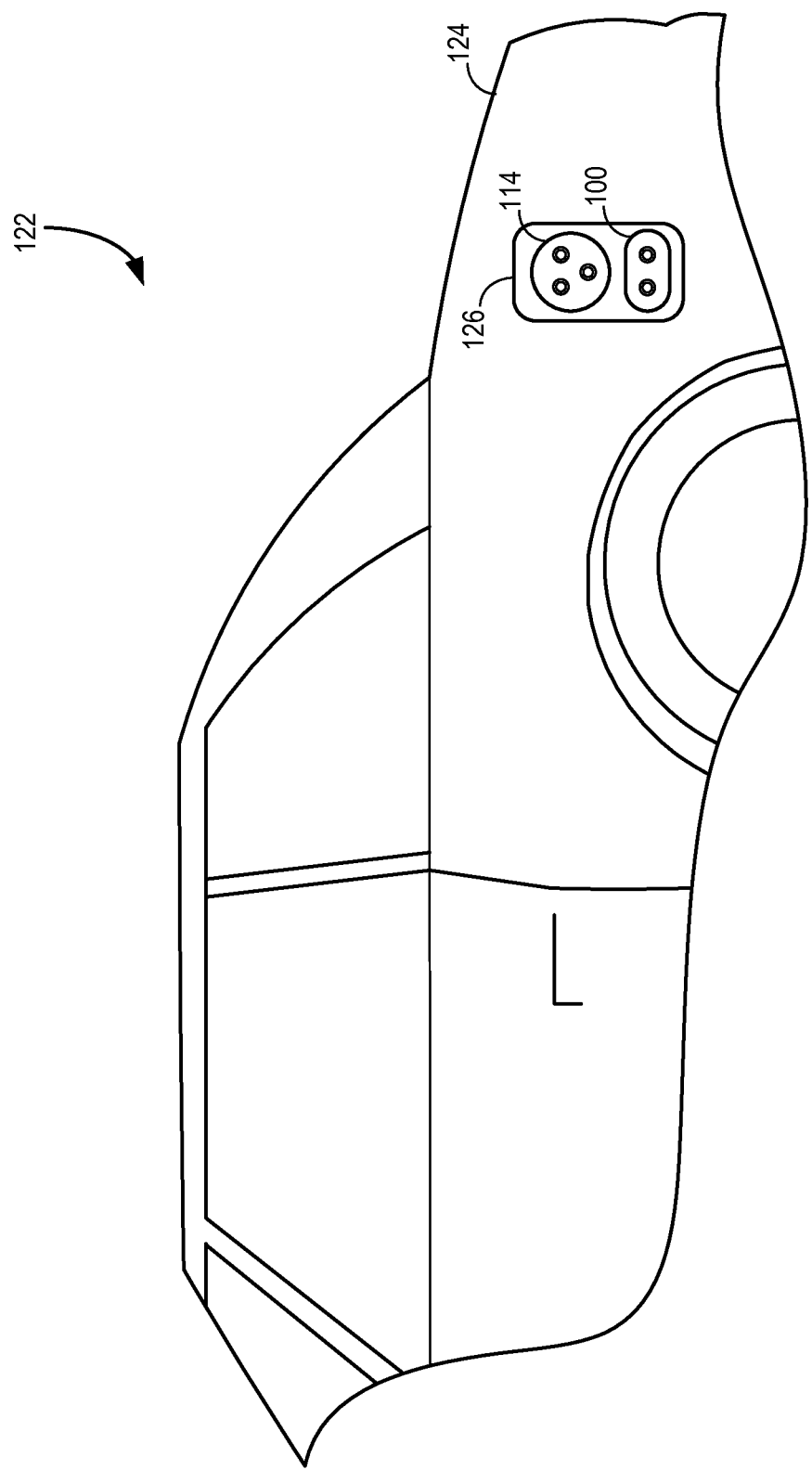
FIG. 2 is a schematic diagram of a portion of a vehicle incorporating a dual-input charging interface usable with the traction system of FIG. 1 according to an embodiment of the invention.

FIG. 2 illustrates a portion of a vehicle 122 that incorporates traction system 10 of FIG. 1. Vehicle 122 includes a vehicle body 124 configured to house occupants and travel on surfaces such as roads and highways. While vehicle 122 is illustrated as a passenger vehicle in FIG. 2, vehicle 122 may be any type of vehicle including, but not limited to, automobiles, busses, trucks, tractors, mining equipment, marine craft, and off-road vehicles, including material transport vehicles or personal carrier vehicles, capable of operation both on the surface and underground such as in mining operations.

According to one embodiment, receptacles 100 and 114 of traction system 10 (FIG. 1) are housed within a dual-input charging interface or common charging interface 126 that is mounted on vehicle body 124. As shown, dual-input charging interface 126 is positioned on a rear portion of a side of the vehicle body 124. However, it will be understood that dual-input charging interface 126 may be disposed anywhere on or within vehicle body 124. Dual-input charging interface 126 may include a cover (not shown) to conceal receptacles 110, 114 when charging system 82 (FIG. 1) is not in use. In an alternative embodiment, receptacles 100 and 114 may be provided within separate housings.

Figure 3:
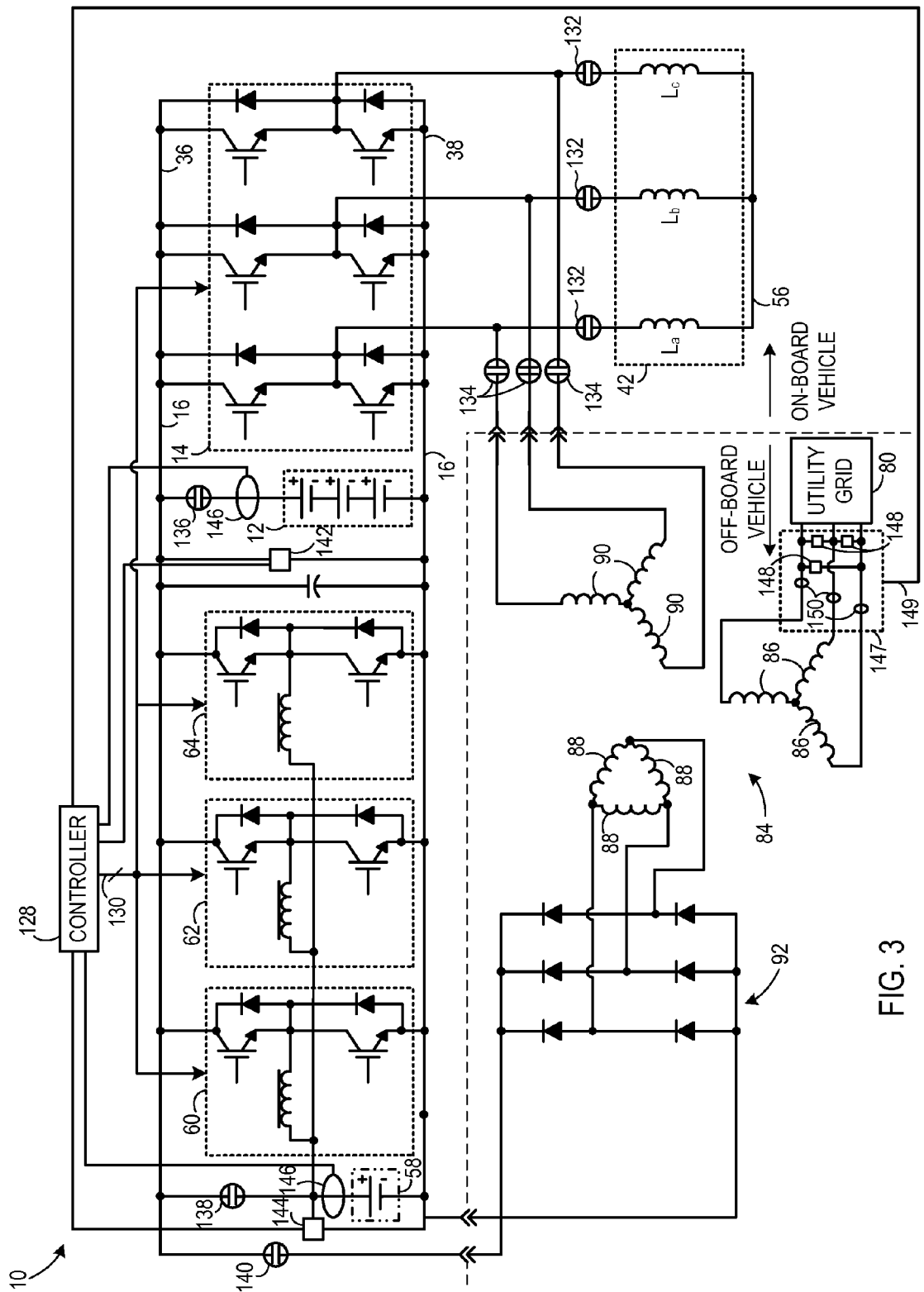
FIG. 3 is a schematic diagram illustrating a control system integrated into the traction system of FIG. 1 according to an embodiment of the invention.

Referring now to FIG. 3, a controller 128 and associated control lines 130 incorporated within traction system 10 are illustrated. For clarity various part numbers have been omitted from the illustration of traction system 10 in FIG. 3. As such, FIGS. 1 and 3 are referenced together with respect to the below discussion of controller 128. As shown, controller 128 is coupled to bi-directional DC-to-DC voltage converters 60, 62, 64 and bi-directional DC-to-AC voltage inverter 14 via lines 130.

As illustrated in FIGS. 1 and 3, traction system 10 includes a first plurality of switches or contactors 132 coupled to windings 46, 48, 50 of motor 42. Switches 132 decouple bi-directional voltage converter assembly 14 from windings 46, 48, 50 during a re-charging operation when charging system 82 is coupled to traction system 10 so that the charging energy does not electrically excite or supply energy to motor 42 and, therefore, motor 42 does not cause the vehicle to move during charging. A second plurality of switches or contactors 134 is positioned between secondary windings 90 of high-impedance voltage source 84 and bi-directional voltage converter assembly 14. Switches or contactors 136, 138 are provided in series with first energy storage device 12 and second energy storage device 58, respectively. In embodiments where first energy storage device 12 or second energy storage device 58 are omitted, corresponding contactors 136, 138 may likewise be omitted. Switch or contactor 140 is provided to selectively decouple secondary windings 88 from traction system 10. According to various embodiments, switching elements 132, 134, 136, 138, and 140 may be constructed as electromechanical switching devices or solid-state type switching devices.

During operation, controller 128 selectively controls operation of switches 132, 134, 136, 138, and 140 of traction system 10 according to a number of charging modes, as described in detail below with respect to FIGS. 4-6. Controller 128 also receives feedback from a number of sensors provided within traction system 10 during a charging operation. A first voltage sensor 142 coupled to controller 128 allows controller 128 to monitor the charging of first energy storage device 12. A second voltage sensor 144 is used to monitor the charging voltage supplied to second energy storage device 58. Again, sensor 142 or sensor 144 may be omitted in embodiments that do not include the corresponding first or second energy storage device 12, 58. Controller 128 is configured to monitor the current of the charging energy via one or more current sensors 146. A sensor system 147 includes line voltage sensors 148 and line current sensors 150 to allow controller 128 to monitor the voltage and current of high-impedance voltage source 84. The output of sensor system 147, generally illustrated by line 149, is received by controller 128. In one embodiment, sensors 148, 150 are provided on primary windings 86, as shown in FIG. 3. Alternatively, sensors 148, 150 may be provided on one or both of secondary windings 88, 90. Further, while voltages sensor 148 is illustrated as a line-line voltage sensor, alternative embodiments may include one or more line-neutral voltage sensors to provide feedback to controller 128. While sensor system 147 is illustrated as including line and voltage sensors 148, 150 corresponding to each phase of high-impedance voltage source 84, sensor system 147 may include less voltage and/or current sensors than the total number of phases. In such embodiments, controller 128 may be programmed with additional processing to calculate the other voltage and/or current values.

In a motoring mode, controller 128 controls switches 132 and switches 136 and/or 138 to a closed state and switches 134, 140 to an open state such that energy from first energy storage device 12 and/or second energy storage device 58 is transferred to DC bus 16. Through appropriate control of half phase modules 18-28, controller 128 is configured to control bi-directional DC-to-AC voltage inverter 14 to convert a DC voltage or current on DC bus 16 to an AC voltage or current for supply to windings 46-50 via conductors 52. Accordingly, the DC voltage or current from first energy storage device 12 and/or second energy storage device 58 may be converted into an AC voltage or current and delivered to motor 42 to drive wheels 44. In other non-vehicle propulsion systems, the drive wheels 44 may be another type of load (not shown), including a pump, fan, winch, crane, or other motor driven loads.

In a regenerative braking mode, electromechanical device 42 may be operated as a generator to brake wheels 44 and to supply AC voltage or current to bi-directional DC-to-AC voltage inverter 14 for inversion into a DC voltage or current onto DC bus 16 that is suitable for recharging first energy storage device 12 or second energy storage device 58, either separately or both simultaneously.

In a re-charging mode, charging energy, such as current, flows from high-impedance voltage source 84 through rectifier 92 and through diodes 152, 154, 156, 158, 160, 162 of bi-directional voltage converter assembly 14 to DC bus 16. Diodes 152-162 provide the rectification to convert the AC power supplied via secondary windings 90 of high-impedance voltage source 84 to DC power for DC bus 16.

In the re-charging mode, controller 128 controls bi-directional voltage inverter 14 to essentially exchange energy with DC link capacitor 40 and/or the energy storage devices 12, 58 being charged in order to correct the utility power factor and high harmonic currents resulting from the use of rectifier 92 to supply the high charging current for rapid charging. Controller 128 senses the three-phase line voltage and line current to the bi-directional voltage converter assembly 14 via sensors 148 and uses the line voltage to generate a line reference current command. Controller 128 also senses the three-phase line currents via sensor 150 and compares this sensed line current to the generated line reference current command. If the line current follows the line voltage, a low-harmonic unity power factor is achieved. Thus, controller 128 compares the line reference current to the sensed line current for error generation and stability compensation, and through appropriate switching control of bi-directional voltage converter assembly 14 controls switching of bi-directional voltage inverter 14 to inject a correction current on DC bus 16 that minimizes the error between the line reference current and sensed line current and forces the utility current to follow or be in phase with the utility voltage. The correction current causes the system to operate within a predetermined threshold of a unity power factor. In one embodiment, the predetermined threshold is within approximately 5% of unity.

Figure 4:
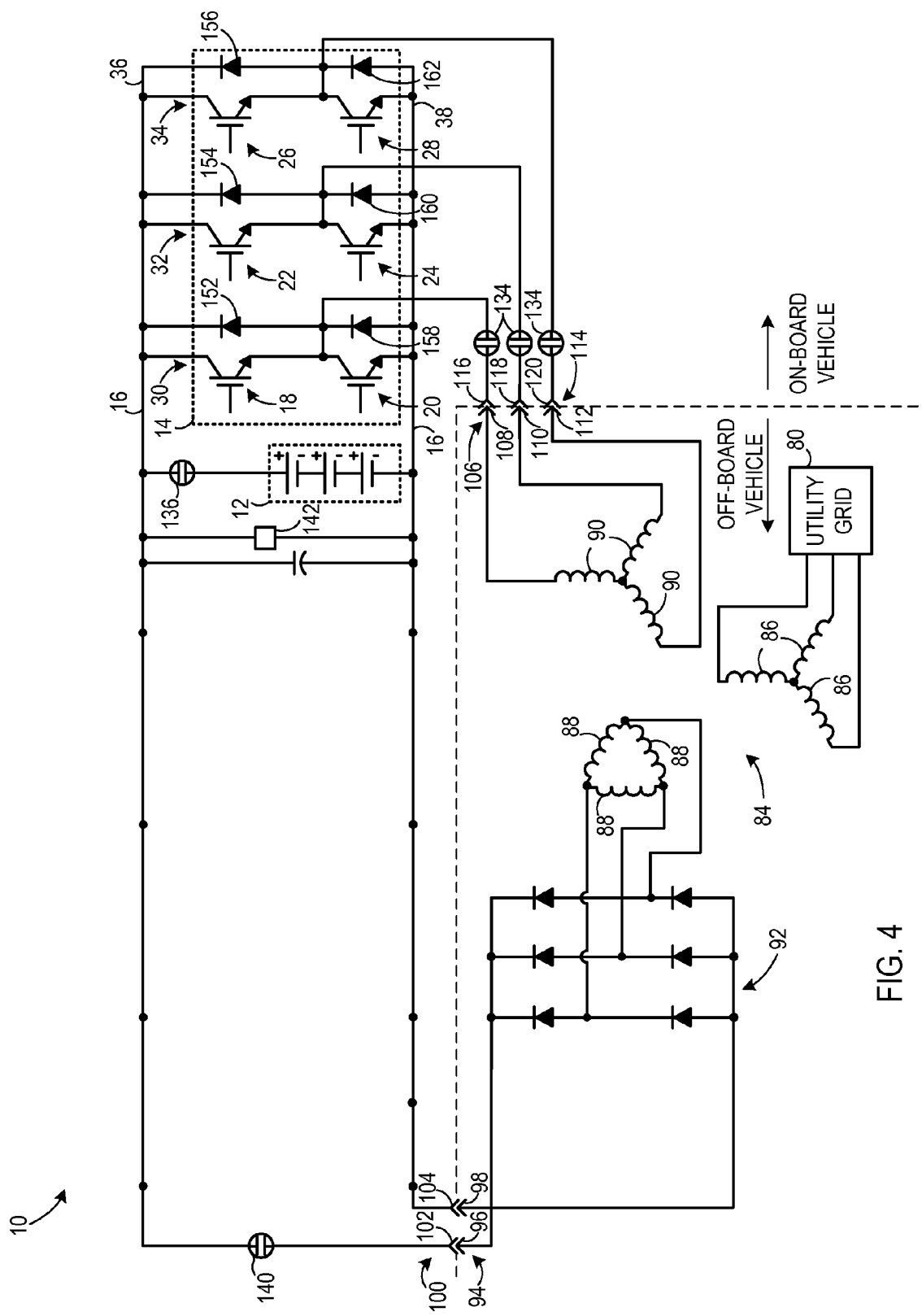
FIG. 4 is a schematic diagram of the traction system of FIG. 1 operating in a first charging mode according to an embodiment of the invention.

Referring now to FIG. 4, the effective circuit of traction system 10 is illustrated when traction system 10 is controlled in a configuration for charging the high-voltage, first energy storage device 12. In the configuration shown, first energy storage device 12 is charged by closing contactor 138 and contactor 140 and opening contactor 136. Contactors 132 are open to decouple motor windings 46, 48, 50 during the charging operation while contactors 134 are closed to couple secondary windings 90 to bi-directional voltage inverter 14. Second energy storage device 58, if present, is removed from the circuit in this charging configuration. Rectifier 92 supplies a high charging current to DC bus 16 for charging first energy storage device 12 while controller 128 controls switching of bi-directional voltage inverter 14 to correct the utility power factor and reduce utility harmonic currents caused by the high charging current from rectifier 92, as described above.

During a charging operation of first energy storage device 12, controller 128 monitors the voltage of first energy storage device 12 via sensor 142 and regulates charging of first energy storage device 12 such that its voltage does not exceed a specified level. Near the end of charging, controller 128 also regulates the re-charging voltage on DC bus 16 to a "float voltage" as the re-charging current tapers to low levels and switches operation of bi-directional voltage converter assembly 14 to a high-power active rectifier mode to maintain first energy storage device 12 at the proper "float voltage" near the end of charge.

Figure 5:
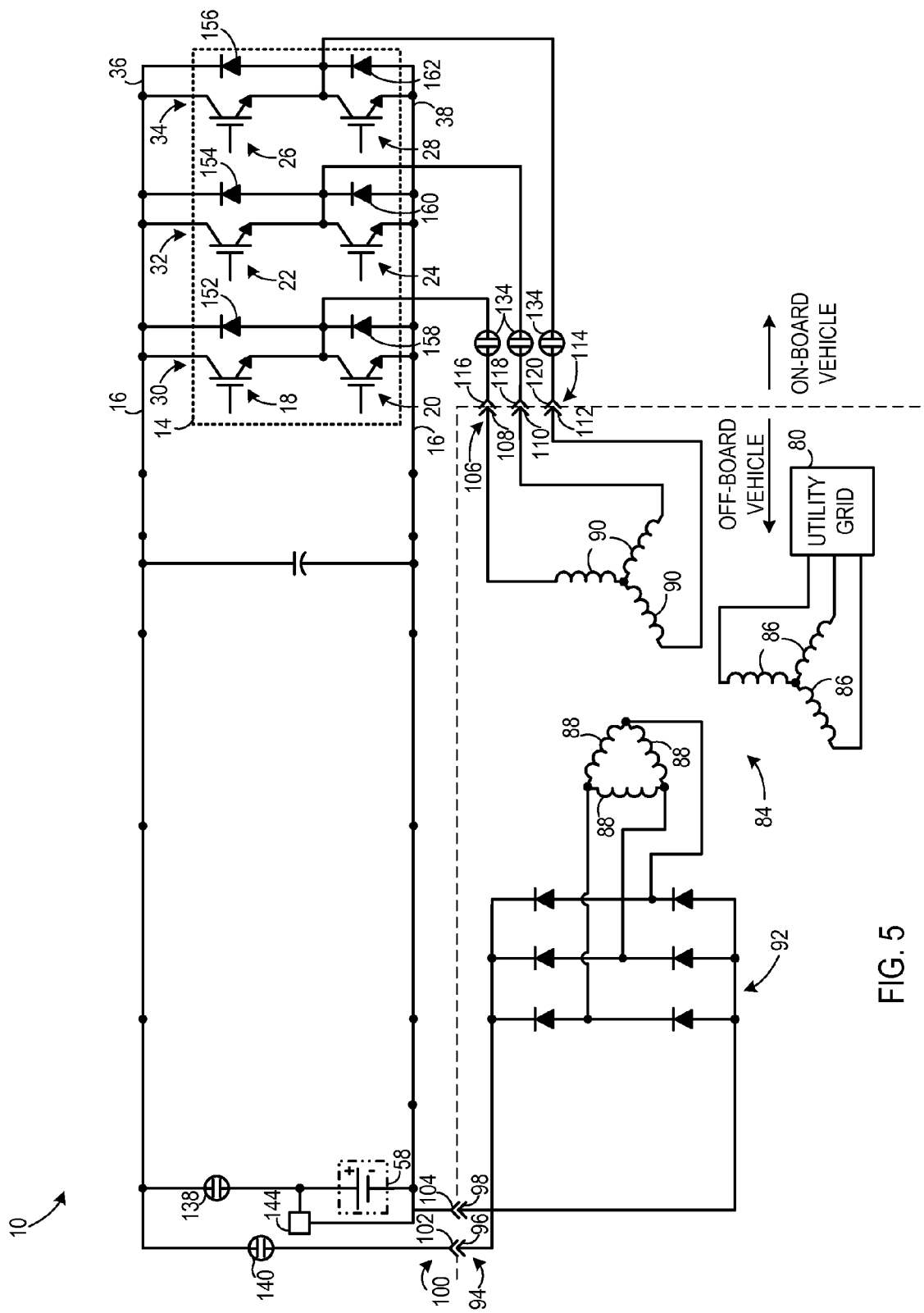
FIG. 5 is a schematic diagram of the traction system of FIG. 1 operating in a second charging mode according to an embodiment of the invention.

FIG. 5 illustrates the effective circuit of traction system 10 in a first configuration for rapid charging of the low-voltage, second energy storage device 58. To achieve the illustrated charging configuration, controller 128 opens contactor 136 to remove the high-voltage, first energy storage device 12 from the circuit (if present) and closes contactor 138 to bypass bi-directional DC-to-DC voltage converters 60, 62, 64 and allow the high charging current supplied to DC bus 16 via rectifier 92 to be applied to second energy storage device 58 directly through closed contactor 138. In this configuration, bi-directional voltage converter assembly 14 is controlled to act as an active filter to achieve unity power factor at the utility input.

In the illustrated charging configuration, controller 128 monitors the state of charge of second energy storage device 58 via sensor 144 and compares the sensed voltage to predetermined voltage limits for second energy storage device 58. When the monitored voltage of second energy storage device 58 reaches or crosses a voltage threshold value, the voltage of second energy storage device 58 is maintained at the "float" or desired voltage. In one embodiment, the threshold value is based on a design and a temperature of second energy storage device 58. When controller 128 senses that second energy storage device 58 is nearing a full charge and as the current reduces, controller 128 opens contactor 138 and operates bi-directional DC-to-DC voltage converters 60, 62, 64 to complete the charge at lower current in a well-controlled manner to bring second energy storage device 58 up to and maintain the proper "float voltage." During this end of charge control, the effective circuit of traction system 10 is configured in a similar manner to that illustrated in FIG. 6.

Figure 6:
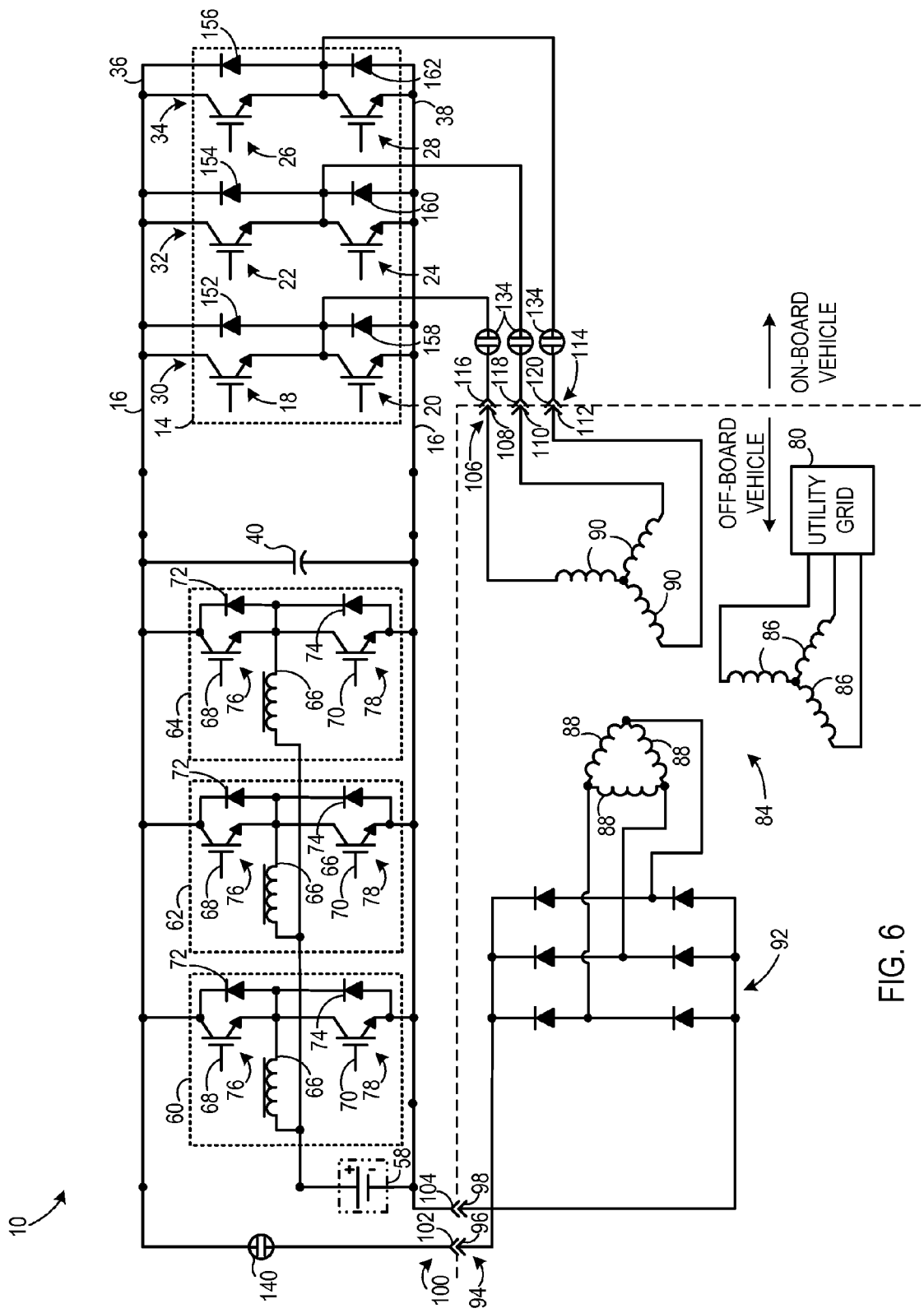
FIG. 6 is a schematic diagram of the traction system of FIG. 1 operating in a third charging mode according to an embodiment of the invention.

FIG. 6 illustrates the effective circuit of traction system 10 in a second configuration for charging second energy storage device 58. This second configuration is similar to that illustrated in FIG. 5, with the exception that contactor 138 is open so that the charging of second energy storage device 58 is controlled by the bi-directional DC-to-DC voltage converters 60, 62, 64. Depending on the number of bi-directional DC-to-DC voltage converters included within traction system 10, the bi-directional DC-to-DC voltage converters 60, 62, 64 may provide adequate power processing to achieve the desired high-current charging from DC bus 16. In this configuration, bi-directional voltage converter assembly 14 still acts as an active filter, but the power it processes is reduced from that associated with the configuration of FIG. 5 since bi-directional DC-to-DC voltage converters 60, 62, 64 can control much of the utility current to achieve a good power factor.

While the various charging configurations are discussed above with respect to charging either first energy storage device 12 or second energy storage device 58, switches 136 and 138 may be operated to simultaneously charge first and second energy storage devices 12, 58 when the nominal voltage of the first and second energy storage devices 12, 58 are appropriately selected and the respective State of Charge (SOC) of each respective energy storage device 12, 58 is within predetermined values.

Figure 7A:
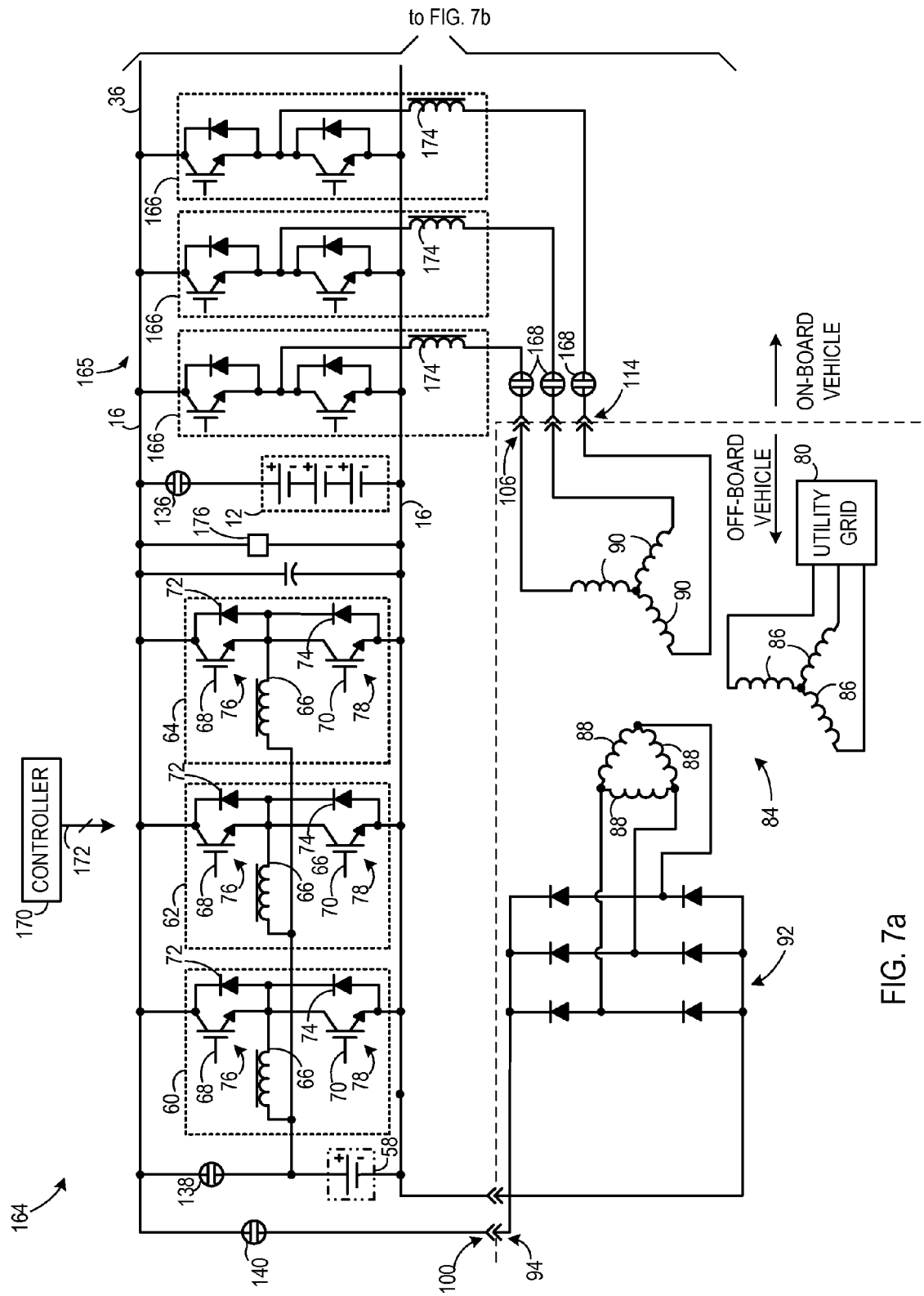
FIGS. 7a and 7b are a schematic diagram of another traction system according to an embodiment of the invention.
Figure 7B:
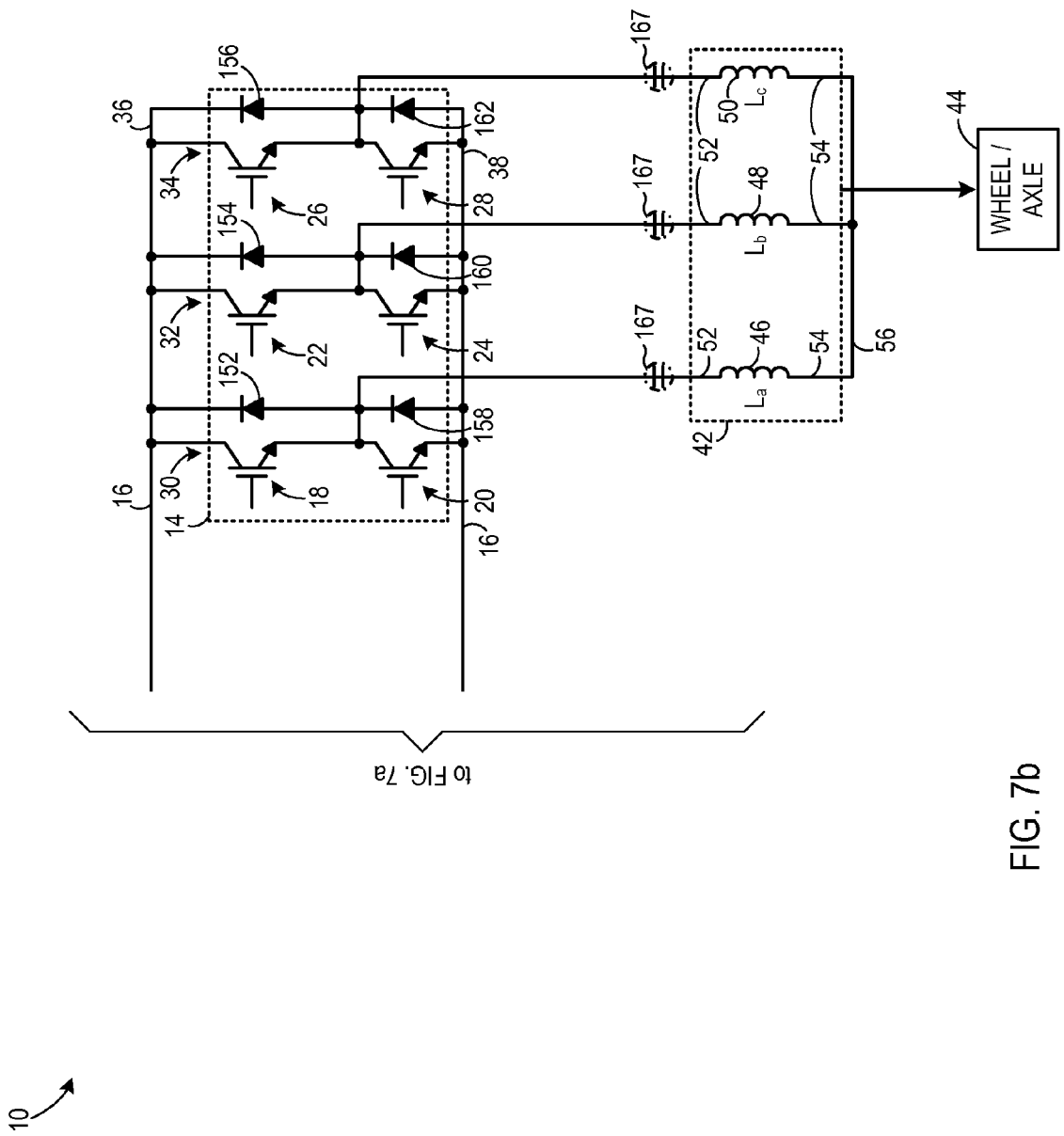

FIGS. 7a and 7b show a schematic diagram of a fraction system 164 according to another embodiment of the invention. Traction system 164 may be used in higher power applications, such as, for example, busses, locomotives, off-highway trucks, mining vehicles, and the like. Elements and components common to traction systems 10 and 164 will be discussed relative to the same reference numbers as appropriate. FIGS. 7a and 7b will also discuss common components of traction system 164 relative to the same reference numbers.

In addition to the components common with traction system 10, traction system 164 includes a bi-directional voltage modification assembly 165 and a plurality of transformer switches or contactors 168 that selectively couple secondary windings 90 of high-impedance voltage source 84 to bi-directional voltage modification assembly 165.

In the embodiment illustrated in FIG. 7a, bi-directional voltage modification assembly 165 includes three bi-directional DC-to-DC voltage converters 166. In alternative embodiments of the invention, bi-directional voltage modification assembly 165 may include more or less than three DC-to-DC converters based on the design specifications of the given traction system. Alternatively, bi-directional voltage modification assembly 165 may be a bi-directional DC-to-AC inverter.

Traction system 164 includes a controller 170 that is coupled via control lines 172 to bi-directional voltage converter assembly 14 and bi-directional DC-to-DC voltage converters 60, 62, 64, and 166. Control lines 172 also couple controller 170 to switches 132, 136, 138, 140, and 168.

When charging first energy storage device 12 or second energy storage device 58, controller 170 operates in a similar manner as described with respect to FIGS. 1-5 with the exception that controller 170 operates bi-directional DC-to-DC voltage converters 166 as a three-phase inverter to achieve the active filter function, rather than controlling bi-directional voltage converter assembly 14 to achieve active filtering as previously described in the charging operation of traction system 10. In embodiments where bi-directional voltage modification assembly 165 includes one or more DC-to-DC voltage converters 166, inductors 174 of bi-directional DC-to-DC voltage converters 166 are used as the filter inductors. Alternatively the leakage inductance of the secondary windings 90, which may have a higher current rating, may be used as the filter inductors, therefore inductors 174 may be eliminated.

In one embodiment, optional switches 167 (shown in phantom) decouple DC-to-AC voltage inverter 14 from windings 46, 48, 50 during a re-charging operation when charging system 82 is coupled to traction system 10 so that the charging energy does not electrically excite or supply energy to motor 42 and, therefore, motor 42 does not cause the vehicle to move during charging. Alternatively, controller 170 may be configured to disable the switching elements of DC-to-AC voltage inverter 14 to prevent the flow of charging energy from DC bus 16 to windings 46, 48, 50 during re-charging.

In a re-charging operation, controller 128 senses a voltage of first energy storage device 12 via a voltage sensor 176 and regulates charging of first energy storage device 12 such that its voltage does not exceed a specified level. Near the end of charging, controller 128 also regulates the re-charging voltage on DC bus 16 to a "float voltage" as the re-charging current tapers to low levels.

Embodiments of the invention thus use components such as inverters and converters already on-board a traction control system to rapidly recharge one or more energy storage devices of the traction control system. In this manner, these components may be used for the dual purposes of motoring and recharging the energy storage devices. Using the on-board components of the vehicles allows for off-board charging stations to have a simple, low cost, high-power design. In addition, a high-current charging may be obtained in a cost effective manner. Rapid charging of the on-board energy storage devices may be thus accomplished using simultaneous, dual inputs from a remote power source through a pair of transformer secondaries. A first input from the remote power source supplies a high charging current to the DC bus for rapid charging while a second input from the remote power source is used to inject a correction current onto the DC bus that reduces harmonics in the charging current and achieves a high power factor that is near unity.

A technical contribution for the disclosed apparatus is that it provides for a controller implemented technique for transferring energy using onboard power electronics.

According to one embodiment of the invention, an apparatus includes a DC bus, a first energy storage device coupled to the DC bus and configured to output a DC voltage, a first bi-directional voltage modification assembly coupled to the DC bus, and a high-impedance voltage source coupleable to the DC bus. The apparatus further includes a charging system having a first receptacle coupled to the DC bus and a second receptacle coupled to the first bi-directional voltage modification assembly. The first receptacle is constructed to mate with a first connector coupled to the high-impedance voltage source and the second receptacle is constructed to mate with a second connector coupled to the high-impedance voltage source. A controller is programmed to control a simultaneous transfer of charging energy through the first and second receptacles of the charging system to the DC bus.

In accordance with another embodiment of the invention, a method for transferring energy between an on-board energy storage device and an external voltage source includes coupling the on-board energy storage device to a DC charging bus, the on-board energy storage device configured to output a DC voltage. The method also includes plugging a first connector coupled to the external voltage source into a first receptacle coupled to the DC charging bus; plugging a second connector coupled to the external voltage source into a second receptacle coupled to the DC charging bus through a bi-directional voltage modification assembly, and programming a controller to close a plurality of contactors to permit a simultaneous transfer of energy to the on-board energy storage device from the external voltage source through the first and second connectors.

In accordance with yet another embodiment of the invention, a system includes a remote power source comprising a transformer and a charging system having a DC connector coupled to the remote power source and an AC connector coupled to the remote power source. The system also includes a vehicle having a DC bus, an energy storage device coupled to the DC bus, a DC receptacle coupled to the DC bus, and an AC receptacle coupled to the DC bus through a bi-directional voltage modification assembly. A controller is programmed to control a transfer of charging energy from the remote power source to the DC bus, the charging energy having a high current component transferred through the DC receptacle and a current correction component transferred through the AC receptacle.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An apparatus comprising:
    a DC bus;
    a first energy storage device coupled to the DC bus, the first energy storage device configured to output a DC voltage;
    a first bi-directional voltage modification assembly coupled to the DC bus;
    a high-impedance voltage source coupleable to the DC bus comprising a first plurality of transformer windings;
    a charging system comprising:
        a first receptacle coupled to the DC bus, the first receptacle constructed to mate with a first connector coupled to the high-impedance voltage source;
        a second receptacle coupled to the first bi-directional voltage modification assembly, the second receptacle constructed to mate with a second connector coupled to the high-impedance voltage source; and
        a rectifier coupled to the first plurality of transformer windings; and
    a controller programmed to control a simultaneous transfer of charging energy through the first and second receptacles of the charging system to the DC bus, and further programmed to control the bi-directional voltage modification assembly to exchange energy with the first energy storage device to correct a power factor.

2. The apparatus of claim 1 wherein the first and second receptacles are housed within a dual-input charging interface.

3. The apparatus of claim 1 wherein the first receptacle is constructed to receive a DC input.

4. The apparatus of claim 1 wherein the second receptacle is constructed to receive an AC input.

5. The apparatus of claim 1 further comprising a plurality of transformer contactors having an open position and a closed position; and
    wherein the plurality of transformer contactors, when positioned in the closed position, are constructed to connect a second plurality of secondary transformer windings of the high-impedance voltage source to the first bi-directional voltage modification assembly.

6. The apparatus of claim 1 further comprising a bi-directional DC-to-DC voltage converter coupled to the DC bus; and
    wherein the first bi-directional voltage modification assembly comprises a bi-directional DC-AC voltage inverter.

7. The apparatus of claim 1 wherein the first bi-directional voltage modification assembly comprises at least one bi-directional DC-DC voltage converter.

8. The apparatus of claim 1 wherein the controller is further programmed to:
    monitor a line current of the high-impedance voltage source;
    monitor a line voltage of the high-impedance voltage source;
    generate a reference current from the monitored line voltage;
    compare the reference current to the monitored line current; and
    calculate the correction current based on the comparison of the reference current and the monitored line current.

9. The apparatus of claim 1 further comprising an electromechanical device coupled to the first bi-directional voltage modification assembly.

10. The apparatus of claim 1 further comprising:
    a second energy storage device coupled to the DC bus, the second energy storage device configured to output a DC voltage;
    a first contactor positioned in series with the first energy storage device and configured to couple the first energy storage device directly to the DC bus; and
    a second contactor positioned in series with the second energy storage device and configured to couple the second energy storage device directly to the DC bus.

11. The apparatus of claim 10 wherein the first energy storage device comprises a high power energy storage device; and
    wherein the second energy storage device comprises a low power energy storage device.

12. A method for transferring energy between an on-board energy storage device and an external voltage source, the method comprising:
    coupling the on-board energy storage device to a DC charging bus, the on-board energy storage device configured to output a DC voltage;
    plugging a first connector coupled to the external voltage source into a first receptacle coupled to the DC charging bus through a rectifier;
    plugging a second connector coupled to the external voltage source into a second receptacle coupled to the DC charging bus through a bi-directional voltage modification assembly; and
    programming a controller to close a plurality of contactors to permit a simultaneous transfer of energy to the on-board energy storage device from the external voltage source through the first and second connectors; and
    further programming the controller to control the bi-directional voltage modification assembly to exchange energy with the first energy storage device to correct a power factor.

13. The method of claim 12 wherein programming the controller reduces a harmonic current of the external voltage source.

14. The method of claim 13 further comprising programming the controller to:
monitor a phase difference between a voltage of the external voltage source and a current of the external voltage source; and
calculate the correction current based on the phase difference to operate within a predetermined threshold of unity.

15. The method of claim 12 wherein coupling the bi-directional voltage modification assembly to the DC charging bus comprises coupling a bi-directional DC-AC voltage inverter to the DC charging bus.

16. The method of claim 12 further comprising coupling a bi-directional DC-DC voltage converter to the DC charging bus.

17. The method of claim 12 further comprising coupling a second on-board energy storage device to the DC charging bus.

18. The method of claim 12 wherein plugging the first connector into the first receptacle comprises coupling a rectified output of a first plurality of secondary windings of the external voltage source to the DC charging bus; and
wherein plugging the second connector into the second receptacle comprises coupling a second plurality of secondary windings of the external voltage source to the bi-directional voltage modification assembly.

19. The method of claim 18 further comprising:
coupling the first plurality of secondary windings to the DC charging bus via a DC connection; and
coupling the second plurality of secondary windings to the bi-directional voltage modification assembly via an AC connection.

20. A system comprising:
a remote power source comprising a transformer;
a charging system comprising:
a DC connector coupled to the remote power source; and
an AC connector coupled to the remote power source;
a vehicle comprising:
a DC bus;
an energy storage device coupled to the DC bus;
a rectifier coupled to the DC bus;
a DC receptacle coupled to the DC bus; and
an AC receptacle coupled to the DC bus through a bi-directional voltage modification assembly; and
a controller programmed to control a transfer of charging energy from the remote power source to the DC bus, the charging energy having a high current component transferred through the DC receptacle and a current correction component transferred through the AC receptacle, the controller further programmed to control the bi-directional voltage modification assembly to exchange energy with the first energy storage device to correct a power factor.

21. The system of claim 20 wherein the rectifier is coupled to a first plurality of secondary windings of the transformer; and
wherein the AC connector is coupled to a second plurality of secondary windings of the transformer.

22. The system of claim 20 wherein the DC receptacle and the AC receptacle are housed within a common charging interface.

\* \* \* \* \*